H. A. M. BROMFIELD.
WEED AND CLOD CUTTER.
APPLICATION FILED APR. 7, 1919.
1,353,626.
Patented Sept. 21, 1920.
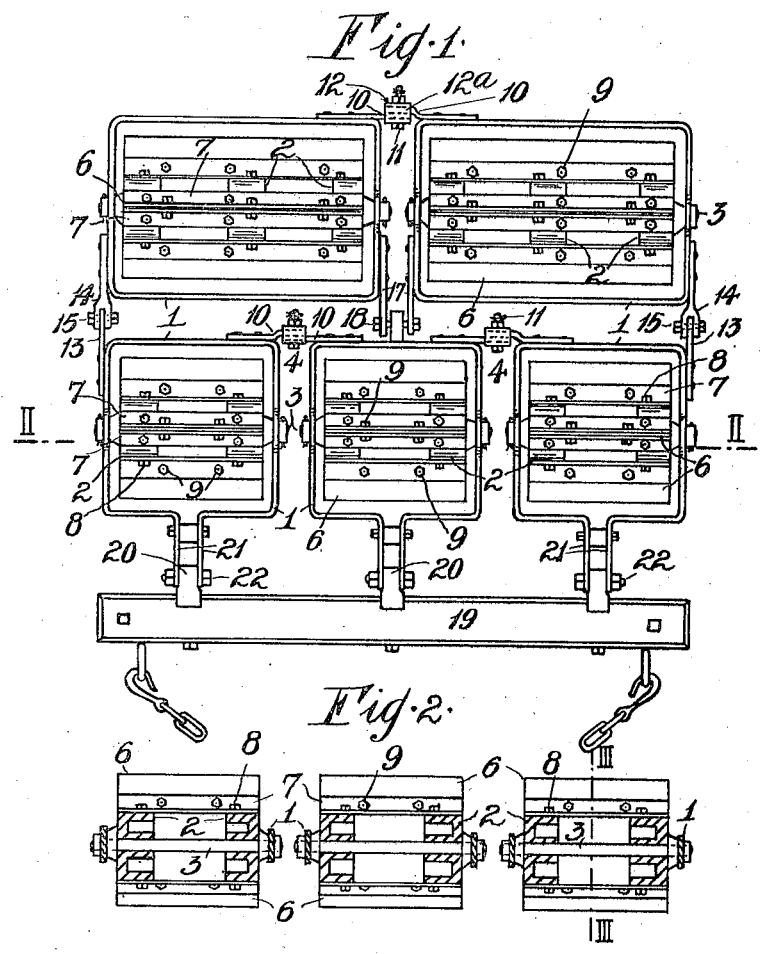

UNITED STATES PATENT OFFICE.

HENRY A. M. BROMFIELD, OF DAYLESFORD, VICTORIA, AUSTRALIA.

WEED AND CLOD CUTTER.

1,353,626.

Specification of Letters Patent.

Patented Sept. 21, 1920.

Application filed April 7, 1919. Serial No. 288,046.

*To all whom it may concern:*

Be it known that I, HENRY ALFRED MILLER BROMFIELD, a subject of the King of Great Britain, of Vincent street, Daylesford, in the State of Victoria, Commonwealth of Australia, solicitor, have invented certain new and useful Improvements in Weed and Clod Cutters, of which the following is a specification.

The rapid and rank growth of bracken fern in light sandy soils taken up for cultivation and grazing purposes involves constant labor in cutting down and removal, which if neglected so that the fern grows woody, becomes exceedingly arduous and the labor cost is at all times expensive on account of the slow progress when ordinary cutting tools such as a scythe or fern hook are used.

The aim of the present invention is to provide traction means capable without undue traction effort by horses or power of effectively cutting down the fern or similar low scrub growths, on uneven surfaces and on steep hilly land.

Briefly stated the essential characteristics of the invention reside in a plurality of series of spaced cutter blades in parallel relationship about and also parallel to a common axis, which latter is disposed at right angles to the line of draft.

In a practical embodiment these blades are straight and held to the periphery of ground rollers by suitable means. The rollers are axially mounted in frames loosely connected or articulated to each other and to the traction bar whereby the frames are capable of independent movement relatively to each other, when operating over uneven surfaces.

A practical illustration of the invention is depicted in the accompanying drawings whereof—

Figure 1 is a plan of implement

Fig. 2 a vertical section on line 11—11 of Fig. 1

Fig. 3 a transverse section on line 111—111 of Fig. 2

Fig. 4 an enlarged detail of one of the connections between the frames.

The roller frames 1 may be arranged in two or more lines the first line most nearly adjacent to the traction bar being constituted of three frames each containing a pair of rollers 2 rotatable upon a common axle 3 fixed to the side bars of the frames. The succeeding rearwardly disposed line of rollers and frames may consist of a pair of frames each containing three rollers, 2, 2, 2, the inner ends of the two frames passing across the spaces 4 between the central and outer frames of the receding frames. The rollers may be hollow with one end closed as illustrated and the arrangement such that extra weight may be introduced therein where required as by slipping a loaded collar on to the axle.

The blades 6 project radially from the rollers and act as distance pieces between the same. The peripheral surface of the rollers is preferably of circular form flatted at equi-distance points where the blades are attached. The blades are conveniently held in position between a pair of angle iron plates 7, 7, the flanges of which are fixed by bolts or the like 8 to the roller and bolts 9 are passed through the other members of the plates projecting parallelly from the roller, and the inner ends of the blade contained between the same.

As previously stated the frames are loosely connected together and according to the construction illustrated adjacent frames in each line are connected by means of horizontally projecting lugs 10 extending toward each other from the rear members of the frame with one bent to enable the ends to overlap, said ends being formed with coinciding holes to take a bolt 11 which is also passed through a plate 12 the ends 12ª of which are bent over the overlapped ends of the lugs.

The object of the lugs 12ª (Fig. 4) is to limit the tilting of a frame when the implement is passing over uneven or undulating ground.

One line of frames is also connected to the other and for this purpose the side members of the end frames of the front row are provided with rearwardly extending lugs 13 which fit between the bifurcated ends of similar lugs 14 extending forwardly from the corresponding frames of the second row and a belt 15 loosely connects the ends of the lugs.

The rear member of the central front frame is provided with a short lug 16 which fits between the ends of lugs 17 projecting from the inner side members of the frames in the rear line, said ends and short lug being loosely connected by a bolt 18.

At the front of the implement is a traction bar 19 provided with lugs 20 to which arms 21 extending forwardly from the front line frames are connected by bolts 22.

To prevent any possibility of the ends of the frames located in line from fouling each other when passing over uneven or undulating ground stops may be provided to limit their movement toward each other.

It is to be understood that I do not limit myself to the particular form of arrangement of the roller frames and cutter blades described as same may be varied according to working conditions.

In use the drawing of the rollers and frames over a ground surface and in contact therewith causes rotation of the rollers the growth being bent down and the cutter blades on account of the weight sever the stems close to the ground.

The apparatus is not limited in its use to the cutting down of scrub growths as it can be effectively employed by breaking up the clods of earth formed in plowed ground.

I claim:—

1. In weed and clod cutters, a series of loosely connected frames arranged in succeeding lines, each frame containing a plurality of ground rollers of equal diameter formed on their peripheries with a series of flattened portions, pairs of angle iron plates bolted to said flattened portions and running parallel to the axle of the rollers, and a cutting blade fitted between and bolted to each pair of said plates.

2. In weed and clod cutters, a series of loosely connected frames arranged in succeeding lines, each frame containing ground rollers of equal diameter provided with longitudinally arranged cutting blades running parallel to the axles of the rollers, the frames of each line being loosely connected by overlapping, oppositely extending lugs through which bolts pass, said lines being similarly connected.

3. In weed and clod cutters, a series of loosely connected frames arranged in succeeding lines, each frame containing ground rollers of equal diameter provided with longitudinally arranged cutting blades running parallel to the axles of the rollers, the frames of each line being loosely connected by overlapping, oppositely extending lugs pivoted on bolts passed through plates formed with bent ends.

4. In weed and clod cutters, a series of loosely connected frames arranged in succeeding lines, each frame containing ground rollers of equal diameter provided with longitudinally arranged cutting blades running parallel to the axles of the rollers, the frames of each line being loosely connected by overlapping, oppositely extending lugs pivoted on bolts passed through plates formed with bent ends, and overlapping, oppositely extending lugs on the lines of frames pivotally connected by bolts.

5. In weed and clod cutters, a series of loosely connected frames arranged in succeeding lines, each frame containing ground rollers of equal diameter provided with longitudinally arranged cutting blades running parallel to the axles of the rollers, a pair of arms extending forwardly from each frame of the front line, and a traction bar provided with rearwardly extending lugs, each pivoted to a pair of said arms.

6. In weed and clod cutters, a series of loosely connected frames arranged in succeeding lines, each frame containing ground rollers, of equal diameter, provided with longitudinally arranged cutting blades running parallel to the axles of the rollers, the frames of each line being loosely connected by overlapping, oppositely extending lugs pivoted on bolts passed through plates formed with bent ends, overlapping, oppositely extending lugs on the lines of the frames pivotally connected by bolts, a forwardly extended pair of arms from each front frame, and a traction bar provided with rearwardly extending lugs, each fitting between one of said pairs of arms and pivoted thereto.

H. A. M. BROMFIELD.